United States Patent
Bellert

(10) Patent No.: US 8,861,014 B2
(45) Date of Patent: Oct. 14, 2014

(54) SYSTEMS AND METHODS FOR OPTIMIZED PRINTER THROUGHPUT IN A MULTI-CORE ENVIRONMENT

(75) Inventor: Darrell Eugene Bellert, Boulder, CO (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 823 days.

(21) Appl. No.: 12/242,668

(22) Filed: Sep. 30, 2008

(65) Prior Publication Data

US 2010/0079809 A1    Apr. 1, 2010

(51) Int. Cl.
*G06K 15/00* (2006.01)
*G06F 3/12* (2006.01)
*G06K 15/02* (2006.01)

(52) U.S. Cl.
CPC ...................................... *G06K 15/02* (2013.01)
USPC ........................... 358/1.17; 358/1.15; 395/114

(58) Field of Classification Search
CPC ...................................................... G06K 15/02
USPC .......................... 358/1.15, 1.16, 1.17; 395/114
See application file for complete search history.

(56) References Cited

U.S. PATENT DOCUMENTS

| | | | |
|---|---|---|---|
| 4,782,398 A | | 11/1988 | Mita |
| 5,010,515 A | | 4/1991 | Torborg et al. |
| 5,041,920 A | | 8/1991 | Hayes et al. |
| 5,319,778 A | | 6/1994 | Catino |
| 5,471,579 A | * | 11/1995 | Kimura et al. ........... 345/505 |
| 5,477,257 A | | 12/1995 | Murata |
| 5,479,587 A | | 12/1995 | Campbell et al. |
| 5,491,808 A | | 2/1996 | Geist, Jr. |
| 5,502,462 A | | 3/1996 | Mical et al. |
| 5,542,031 A | * | 7/1996 | Douglass et al. ........... 358/1.15 |
| 5,577,243 A | | 11/1996 | Sherwood et al. |
| 5,646,670 A | | 7/1997 | Seto et al. |
| 5,739,842 A | | 4/1998 | Murata |

(Continued)

FOREIGN PATENT DOCUMENTS

| | | |
|---|---|---|
| JP | 02-275525 | 11/1990 |
| JP | 08-130618 A | 5/1996 |

(Continued)

OTHER PUBLICATIONS

Office Action dated Aug. 18, 2009, in U.S. Appl. No. 11/394,783, filed Mar. 31, 2006.

(Continued)

*Primary Examiner* — Douglas Tran
*Assistant Examiner* — Justin Katzwhite
(74) *Attorney, Agent, or Firm* — Osha • Liang LLP

(57) ABSTRACT

Systems and methods consistent with some embodiments presented provide methods for the concurrent generation and parallel rasterization of at least one display list in a memory pool comprising frame buffer memory and display list memory, wherein the display list comprises a plurality of equal sized display list blocks, the method comprises: monitoring the completion status of the display list blocks; monitoring the availability of rasterization processes; assigning a completed display list block to an available rasterization process; and rasterizing the display list block using the available rasterization process. In some embodiments, rasterization processes may run concurrently and operate on distinct blocks corresponding to distinct bands. Rasterized display list blocks are returned to the memory pool. In some embodiments, each concurrently executing rasterization process may execute on a distinct core of a multi-core processor.

14 Claims, 5 Drawing Sheets

(56) References Cited

U.S. PATENT DOCUMENTS

| | | |
|---|---|---|
| 5,760,811 A | 6/1998 | Seto et al. |
| 5,778,414 A | 7/1998 | Winter et al. |
| 5,793,937 A | 8/1998 | Chura et al. |
| 5,864,342 A | 1/1999 | Kaijiya et al. |
| 5,870,534 A | 2/1999 | Tsuchitoi |
| 5,913,018 A | 6/1999 | Sela |
| 5,946,334 A | 8/1999 | Ema et al. |
| 5,959,867 A | 9/1999 | Speciner et al. |
| 5,978,893 A | 11/1999 | Bakshi et al. |
| 5,999,709 A | 12/1999 | Fiala et al. |
| 6,031,995 A | 2/2000 | George |
| 6,040,917 A | 3/2000 | Campbell et al. |
| 6,057,847 A | 5/2000 | Jenkins |
| 6,092,171 A | 7/2000 | Relph |
| 6,111,582 A | 8/2000 | Jenkins |
| 6,192,157 B1 | 2/2001 | Prebble |
| 6,215,513 B1 | 4/2001 | Ashikaga |
| 6,249,793 B1 | 6/2001 | Printezis et al. |
| 6,252,675 B1 | 6/2001 | Jacobs |
| 6,326,964 B1 | 12/2001 | Snyder et al. |
| 6,366,289 B1 | 4/2002 | Johns |
| 6,369,911 B1 | 4/2002 | Hattori |
| 6,472,946 B2 | 10/2002 | Takagi |
| 6,476,847 B2 | 11/2002 | Satoh et al. |
| 6,490,670 B1 | 12/2002 | Collins et al. |
| 6,498,617 B1 | 12/2002 | Ishida et al. |
| 6,603,116 B2 | 8/2003 | Niito |
| 6,643,759 B2 | 11/2003 | Andersson et al. |
| 6,701,420 B1 | 3/2004 | Hamilton et al. |
| 6,707,563 B1 | 3/2004 | Barry et al. |
| 6,731,317 B2 | 5/2004 | Ema et al. |
| 6,775,032 B2 | 8/2004 | Jacobs |
| 6,778,292 B1 | 8/2004 | Someno |
| 6,809,730 B2 | 10/2004 | Howson |
| 6,860,203 B2 | 3/2005 | Danilo et al. |
| 7,009,729 B2 | 3/2006 | Fujita |
| 7,031,025 B1 | 4/2006 | He et al. |
| 7,038,671 B2 | 5/2006 | Willis et al. |
| 7,064,859 B1 | 6/2006 | Dittrich et al. |
| 7,113,302 B2 | 9/2006 | Reddy et al. |
| 7,196,710 B1 | 3/2007 | Fouladi et al. |
| 7,428,075 B2 | 9/2008 | Johnston |
| 7,447,836 B2 | 11/2008 | Zhang et al. |
| 7,697,168 B2 | 4/2010 | Ozawa et al. |
| 7,715,031 B2 * | 5/2010 | Westervelt et al. .......... 358/1.15 |
| 7,775,435 B2 | 8/2010 | Tomita |
| 8,045,215 B2 | 10/2011 | Jacobsen et al. |
| 8,228,555 B2 | 7/2012 | Prebble |
| 8,526,049 B2 | 9/2013 | Guarnieri et al. |
| 2001/0015820 A1 | 8/2001 | Conrad et al. |
| 2001/0030769 A1 | 10/2001 | Jacobs |
| 2001/0030796 A1 | 10/2001 | Yao |
| 2001/0055129 A1 | 12/2001 | Shimizu |
| 2002/0063894 A1 | 5/2002 | Campbell et al. |
| 2002/0078298 A1 | 6/2002 | Jeddeloh |
| 2002/0093669 A1 | 7/2002 | Campbell et al. |
| 2002/0097433 A1 | 7/2002 | Chang et al. |
| 2002/0120826 A1 | 8/2002 | Venkatraman et al. |
| 2003/0120930 A1 | 6/2003 | Simpson et al. |
| 2004/0044873 A1 | 3/2004 | Wong et al. |
| 2004/0098544 A1 | 5/2004 | Gaither et al. |
| 2004/0120007 A1 | 6/2004 | Jacobsen et al. |
| 2004/0156079 A1 | 8/2004 | Marshall et al. |
| 2004/0193775 A1 | 9/2004 | Van Doren et al. |
| 2004/0199865 A1 | 10/2004 | Bie et al. |
| 2004/0207861 A1 | 10/2004 | Hattori |
| 2004/0233207 A1 | 11/2004 | Morphet |
| 2005/0044549 A1 | 2/2005 | Morikawa et al. |
| 2005/0067498 A1 | 3/2005 | Smith |
| 2006/0001467 A1 | 1/2006 | Fujino et al. |
| 2006/0069898 A1 | 3/2006 | Patel et al. |
| 2006/0077193 A1 | 4/2006 | Thielemans et al. |
| 2006/0288187 A1 | 12/2006 | Burugula et al. |
| 2007/0146785 A1 | 6/2007 | Akiyama et al. |
| 2007/0153247 A1 | 7/2007 | Nagasaka |
| 2007/0229900 A1 | 10/2007 | Guarnieri et al. |
| 2007/0236733 A1 | 10/2007 | Guarnieri et al. |
| 2008/0002018 A1 | 1/2008 | Johnston |
| 2008/0002228 A1 | 1/2008 | Johnston |
| 2008/0002229 A1 | 1/2008 | Johnston |
| 2008/0007744 A1 | 1/2008 | Johnston |
| 2008/0007745 A1 | 1/2008 | Johnston |
| 2008/0162863 A1 | 7/2008 | McClure et al. |
| 2009/0086254 A1* | 4/2009 | Duong .......................... 358/1.15 |
| 2009/0172336 A1 | 7/2009 | Schmidt |
| 2009/0244593 A1 | 10/2009 | Prebble |
| 2009/0249017 A1 | 10/2009 | Prebble |
| 2010/0053179 A1 | 3/2010 | Bellert |
| 2010/0060934 A1 | 3/2010 | Bellert |

FOREIGN PATENT DOCUMENTS

| | | |
|---|---|---|
| JP | H8-202611 A | 8/1996 |
| JP | 2000-141811 A | 5/2000 |
| JP | 2003-011440 A | 1/2003 |
| JP | 2004-038527 A | 2/2004 |
| JP | 2004-054933 | 2/2004 |
| JP | 2005-073004 | 3/2005 |
| JP | 2005-190487 | 7/2005 |
| JP | 2005-327255 | 11/2005 |
| JP | 2009-245437 | 10/2009 |

OTHER PUBLICATIONS

Office Action dated Apr. 13, 2009, in U.S. Appl. No. 11/394,783, filed Mar. 31, 2006.
Office Action dated Nov. 26, 2010, in U.S. Appl. No. 11/394,783, filed Mar. 31, 2006.
Office Action dated May 23, 2011, in U.S. Appl. No. 11/394,783, filed Mar. 31, 2006.
Office Action dated Mar. 21, 2011, in U.S. Appl. No. 11/515,337, filed Aug. 31, 2006.
Office Action dated Oct. 7, 2010, in U.S. Appl. No. 12/059,692, filed Mar. 31, 2008.
Office Action dated Apr. 6, 2011, in U.S. Appl. No. 12/059,692, filed Mar. 31, 2008.
Office Action dated Apr. 27, 2011, in U.S. Appl. No. 12/201,735, filed Aug. 29, 2008.
Office Action dated Sep. 12, 2011, in U.S. Appl. No. 11/515,337, filed Aug. 31, 2006.
Office Action dated Jan. 5, 2012, in U.S. Appl. No. 11/515,337, filed Aug. 31, 2006.
Office Action dated Nov. 23, 2011, in U.S. Appl. No. 12/059,627, filed Mar. 31, 2008.
Notice of Allowance dated Mar. 23, 2012, in U.S. Appl. No. 12/059,627, filed Mar. 31, 2008.
Office Action dated Sep. 30, 2011, in U.S. Appl. No. 12/201,735, filed Aug. 29, 2008.
Office Action dated Dec. 15, 2011, in U.S. Appl. No. 12/209,046, filed Sep. 11, 2008.
Office Action dated Sep. 7, 2012, in U.S. Appl. No. 11/515,337, filed Aug. 31, 2006.
Office Action dated Jul. 2, 2012, in U.S. Appl. No. 12/201,735, filed Aug. 29, 2008.
Office Action dated Jun. 11, 2012, in U.S. Appl. No. 12/209,046, filed Sep. 11, 2008.
Office Action dated Aug. 17, 2012, in U.S. Appl. No. 12/242,668, filed Sep. 30, 2008.
Office Action dated Dec. 11, 2012, in U.S. Appl. No. 12/059,692, filed Mar. 31, 2008.
Office Action dated Feb. 26, 2013, in U.S. Appl. No. 12/201,735, filed Aug. 29, 2008.
Office Action dispatched Jun. 18, 2013 in JP Patent Application No. 2009-222772.
Advisory Action dated Aug. 21, 2013, in U.S. Appl. No. 12/201,735, filed Aug. 29, 2008.
Notice of Allowance dated Apr. 22, 2013, in U.S. Appl. No. 11/394,783, filed Mar. 31, 2006.
Office Action dated Jan. 16, 2013, in U.S. Appl. No. 11/394,783, filed Mar. 31, 2006.

(56) References Cited

OTHER PUBLICATIONS

Office Action dated Jun. 10, 2013, in U.S. Appl. No. 11/515,337, filed Aug. 31, 2006.
Office Action dated May 15, 2013, in U.S. Appl. No. 12/059,692, filed Mar. 31, 2008.
Office Action dated Apr. 19, 2013, in U.S. Appl. No. 12/209,046, filed Sep. 11, 2008.
Notification of Reasons for Refusal mailed by the Japanese Patent Office on Feb. 19, 2013, in Japanese patent application No. 2009-081519.
Notification of Reasons for Refusal mailed by the Japanese Patent Office on Jul. 16, 2013, in Japanese patent application No. 2009-192942.
Notification of Refusal for JP patent application No. 2009-192942, with English translation dated Oct. 29, 2013.
Notification of Refusal with English language translation mailed by the Japanese Patent Office on Dec. 10, 2013, in counterpart Japanese Application No. 2009-206817.
Notice of Abandonment dated Dec. 16, 2013, in U.S. Appl. No. 11/515,337, filed Aug. 31, 2006.
Office Action dated Nov. 8, 2013, in U.S. Appl. No. 12/059,692, filed Mar. 31, 2008.
Office Action dated Dec. 3, 2013, in U.S. Appl. No. 12/201,735, filed Aug. 29, 2008.
Office Action dated Sep. 27, 2013, in U.S. Appl. No. 12/209,046, filed Sep. 11, 2008.

\* cited by examiner

SYSTEMS AND METHODS FOR OPTIMIZED PRINTER THROUGHPUT IN A MULTI-CORE ENVIRONMENT

BACKGROUND

1. Field of the Invention

The present invention relates to the field of printing and in particular, to systems and methods to optimize printer throughput utilizing a multi-core environment.

2. Description of Related Art

Document processing software allows users to view, edit, process, and store documents conveniently. Pages in a document may be displayed on screen exactly as they would appear in print. However, before the document can be printed, pages in the document are often described in a page description language ("PDL"). A PDL description of a document provides a high-level description of each page in a document. This PDL description is often translated to a series of lower-level printer-specific commands when the document is being printed. As used in this application PDLs may include Personalized Print Markup Language ("PPML"), PostScript™, Adobe PDF™, HP PCL™, Microsoft XPS™, and variants thereof as well as any other languages used to describe pages in a document. The Personal Printer Markup Language ("PPML") specification permits printer languages to identify, store, and re-use objects such as text and graphic elements.

The PDL description is parsed and typically converted to an intermediate form termed a display list, which can hold objects, including commands (also called display list primitives). Display list commands define data objects and their contexts within a document or a page within the document to be printed. The display list is parsed and then converted into a final form, which can be used to place marks on a print medium. The process of translation from a display list representation of a document to a lower-level description that may be used to place marks on a print medium is termed rasterization. Rasterization may be performed on a computer, printer, or distributed between the computer and printer.

Rasterization typically renders pages one at a time by determining pixels affected by a display list command and modifying those pixels appropriately. When a page is ready to be rasterized, it may be operated upon by a rasterizer. However, in some instances, the time taken to generate the entire display list for a page may be significant. During this period a processor may be idle. In addition, in modern multi-core processors (which can contain several processor "cores" in a single chip or package), one or more cores may be idle while waiting for the generation of the entire display list for a page.

Idling of processors is a waste of computational resources and suggests either a poor design (excessive capacity) or poor utilization (inability to use existing resources). In addition, idle cycles on processors can affect performance and rendering speed. Thus, better utilization of available computing resources permits greater functionality and/or better performance at a lower price point.

Therefore, there is a need for systems and method to optimally use available computing resources.

SUMMARY

In accordance with the present invention, systems and methods for print resource management are presented. Embodiments of methods for the concurrent generation and parallel rasterization of at least one display list in a memory pool are presented. The memory pool comprises frame buffer memory and display list memory and the display list comprises a plurality of equal sized display list blocks. In some embodiments, the concurrent generation and parallel rasterization method comprises: monitoring the completion status of the display list blocks; monitoring the availability of rasterization processes; assigning a completed display list block to an available rasterization process; and rasterizing the display list block using the available rasterization process.

Embodiments of the present invention also relate to instructions created, stored, accessed, or modified by processors using computer-readable media and/or computer-readable memory.

These and other embodiments are further explained below with respect to the following figures.

DETAILED DESCRIPTION

Consistent with disclosed embodiments, systems and methods for the concurrent generation and parallel rasterization of an intermediate form of data generated from a first form of data are presented. In some embodiments, the first printable data may take the form of a PDL description of a document and the intermediate printable data may take the form of a display list generated from the PDL description.

Figure 1:
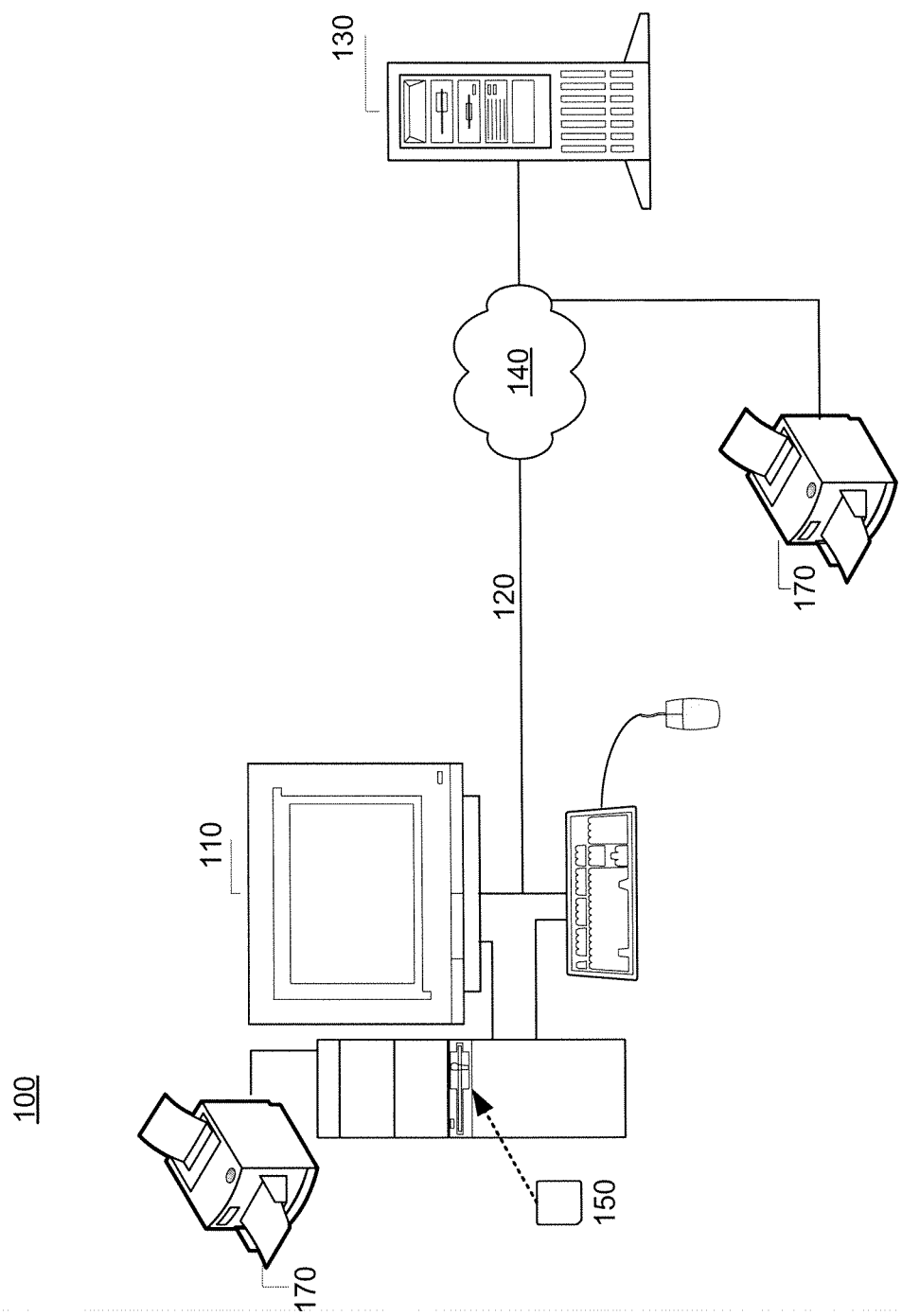
FIG. 1 shows a block diagram illustrating components in a system for printing documents.

FIG. 1 shows a block diagram illustrating components in an exemplary system for printing documents. A computer software application consistent with the present invention may be deployed on a network of computers, as shown in FIG. 1, that are connected through communication links that allow information to be exchanged using conventional communication protocols and/or data port interfaces.

As shown in FIG. 1, exemplary system 100 includes computers such as a computing device 110 and a server 130. Computing device 110 and/or server 130 may be multi-processor or multiple Central Processing Unit ("CPU") systems. In some embodiments, the processors may comprise multiple processor cores in a single package. For example, Intel Pentium™ processors include dual-core (two-core), and quad-core (four-core) systems. The processor cores behave like independent closely-coupled CPU's and can work in a coordinated fashion under program or hardware control.

Computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing software (not shown) that allows the printing of documents using printers 170.

Exemplary printer 170 includes devices that produce physical documents from electronic data including, electrophotographic printers, such as laser printers and LED printers, ink-jet printers, thermal printers, laser imagers, and offset printers. Printer 170 may have an image transmitting/receiving function, an image scanning function, and/or a copying function, as installed in facsimile machines and digital copiers.

In some embodiments, printer 170 may also be capable of directly printing documents received from computing device 110 or server 130 over connection 120. In some embodiments such an arrangement may allow for the direct printing of documents, with (or without) additional processing by computing device 110 or server 130. In some embodiments, documents may contain one or more of text, graphics, and images. In some embodiments, printer 170 may receive PDL descriptions of documents for printing. Note, too, that document print processing can be distributed. Thus, computing device 110, server 130, and/or the printer may perform portions of document print processing including some portion of rasterization, half-toning, color matching, and/or other manipulation processes before a document is physically printed by printer 170.

Computing device 110 may also contain removable media drive 150. Removable media drive 150 may include, for example, 3.5 inch floppy drives, CD-ROM drives, DVD ROM drives, CD±RW or DVD±RW drives, USB™ flash drives, and/or any other removable media drives consistent with embodiments of the present invention. In some embodiments, portions of the software application may reside on removable media and be read and executed by computing device 110 using removable media drive 150.

Connection 120 couples computing device 110, server 130, and printer 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as parallel ports, serial ports, Ethernet, USB™, SCSI, FIREWIRE™, and/or coaxial cable ports for transmission of data through the appropriate connection. In some embodiments, the data ports may be wireless and the communication links could be some combination of wireless links or wired links that allows communication between the various devices.

Network 140 could include a Local Area Network (LAN), a Wide Area Network (WAN), or the Internet. Printer 170 may be connected to network 140 through connection 120. In some embodiments, printer 170 may also be connected directly to computing device 110 and/or server 130.

A computer software application consistent with disclosed embodiments may be deployed on any of the exemplary computers, as shown in FIG. 1. For example, computing device 110 could execute software that may be downloaded directly from server 130. Portions of the application may also be executed by printer 170.

Figure 2:
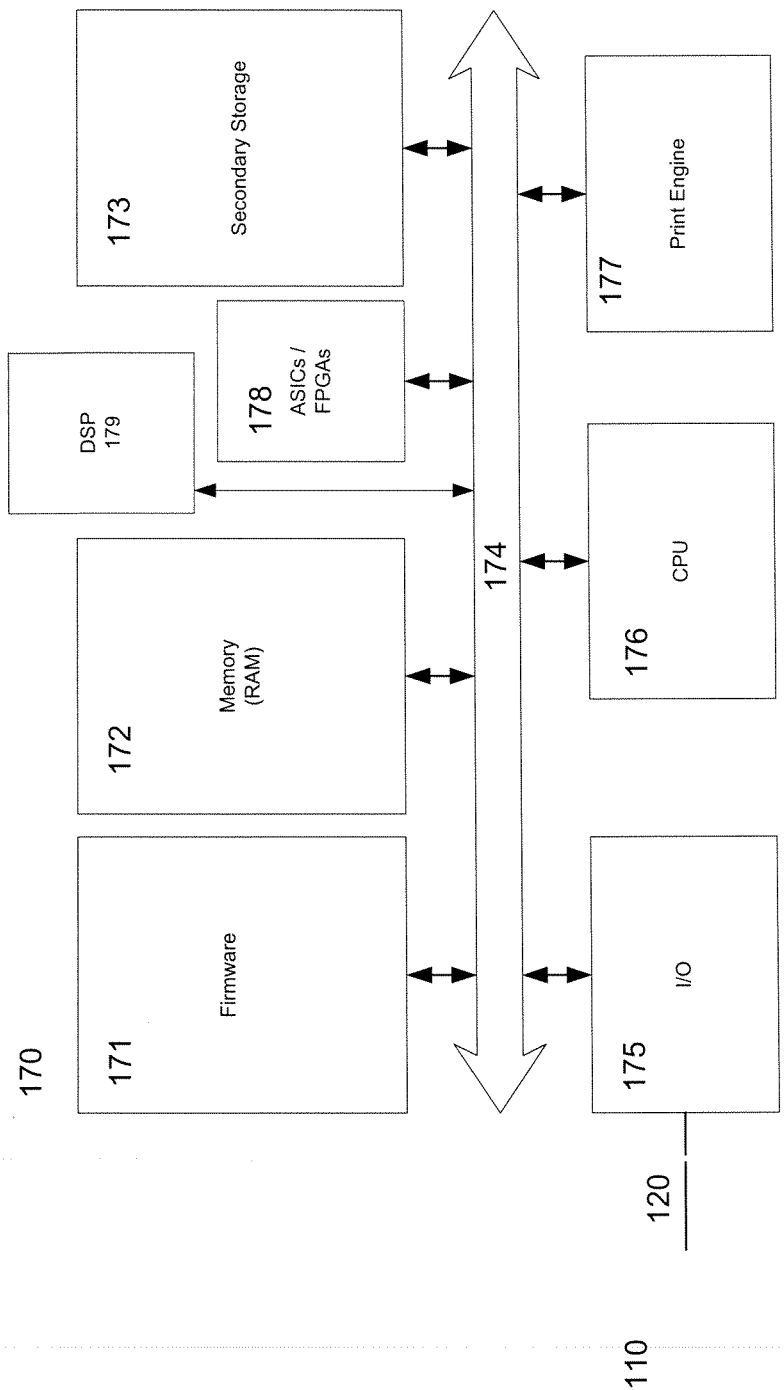
FIG. 2 shows a high level block diagram of an exemplary printer.

FIG. 2 shows a high-level block diagram of exemplary printer 170. In some embodiments, printer 170 may contain bus 174 that couples CPU 176, Digital Signal Processor ("DSP") 179, firmware 171, memory 172, input-output ports 175, print engine 177, and secondary storage device 173. Printer 170 may also contain other Application Specific Integrated Circuits (ASICs), and/or Field Programmable Gate Arrays (FPGAs) 178 that are capable of executing portions of an application to print documents. In one embodiment, DSP 179 may have multiple cores.

In some embodiments, printer 170 may also be able to access secondary storage or other memory in computing device 110 using I/O ports 175 and connection 120. In some embodiments, printer 170 may also be capable of executing software including a printer operating system and other appropriate application software. In some embodiments, printer 170 may allow paper sizes, output trays, color selections, and print resolution, among other options, to be user-configurable.

In some embodiments, CPU 176 may be a general-purpose processor, a special purpose processor, or an embedded processor. In one embodiment, CPU 176 may be a multi-core processor, with the cores capable of parallel operation. In some embodiments, each core of the multi-core processor may be able to independently perform functions recited below for CPU 176. CPU 176 can exchange data including control information and instructions with memory 172 and/or firmware 171. Memory 172 may be any type of Dynamic Random Access Memory ("DRAM") such as but not limited to SDRAM, or RDRAM.

Firmware 171 may hold instructions and data including but not limited to a boot-up sequence, predefined routines, and other code. In some embodiments, code and data in firmware 171 may be copied to memory 172 prior to being acted upon by CPU 176. Routines in firmware 171 may include code to translate page descriptions received from computing device 110 to display lists and image bands. In some embodiments, firmware 171 may include rasterization routines to convert display commands in a display list to an appropriate rasterized pixel map and store the pixel map in memory 172. Firmware 171 may also include compression routines and memory management routines. In some embodiments, data and instructions in firmware 171 may be upgradeable.

In some embodiments, CPU 176 may act upon instructions and data and provide control and data to ASICs/FPGAs 178 and print engine 177 to generate printed documents. In some embodiments, ASICs/FPGAs 178 may also provide control and data to print engine 177. FPGAs/ASICs 178 may also implement one or more of translation, compression, and rasterization algorithms. In one embodiment, portions of concurrent generation and parallel rasterization routines may be performed in parallel by multiple cores of DSP 179.

In some embodiments, computing device 110 can transform document data into a first printable data. Then, the first printable data can be sent to printer 170 for transformation into intermediate printable data. Printer 170 may transform intermediate printable data into a final form of printable data and print according to this final form. In some embodiments, the first printable data may correspond to a PDL description of a document.

In some embodiments, the translation process from a PDL description of a document to the final printable data comprising of a series of lower-level printer-specific commands may include the generation of intermediate printable data comprising of display lists of objects. In some embodiments, display lists may hold one or more of text, graphics, command, and image data objects. In some embodiments, objects in display lists may correspond to similar objects in a user document. In some embodiments, display lists may aid in the generation of intermediate printable data.

In some embodiments, display lists may be stored in memory 172 or secondary storage 173. Exemplary secondary storage 173 may be an internal or external hard disk, memory stick, or any other memory storage device capable of being used by printer 170. In one embodiment, printer 170 may have a removable media drive (not shown). In some embodiments, the display list may reside in one or more of printer 170, computing device 110, and server 130. Memory to store display lists may be a dedicated memory or form part of general purpose memory, or some combination thereof according to some embodiments of the present invention. In some embodiments, memory may be dynamically allocated to hold display lists as needed. In some embodiments, memory allocated to store display lists may be dynamically released after processing.

Figure 3:
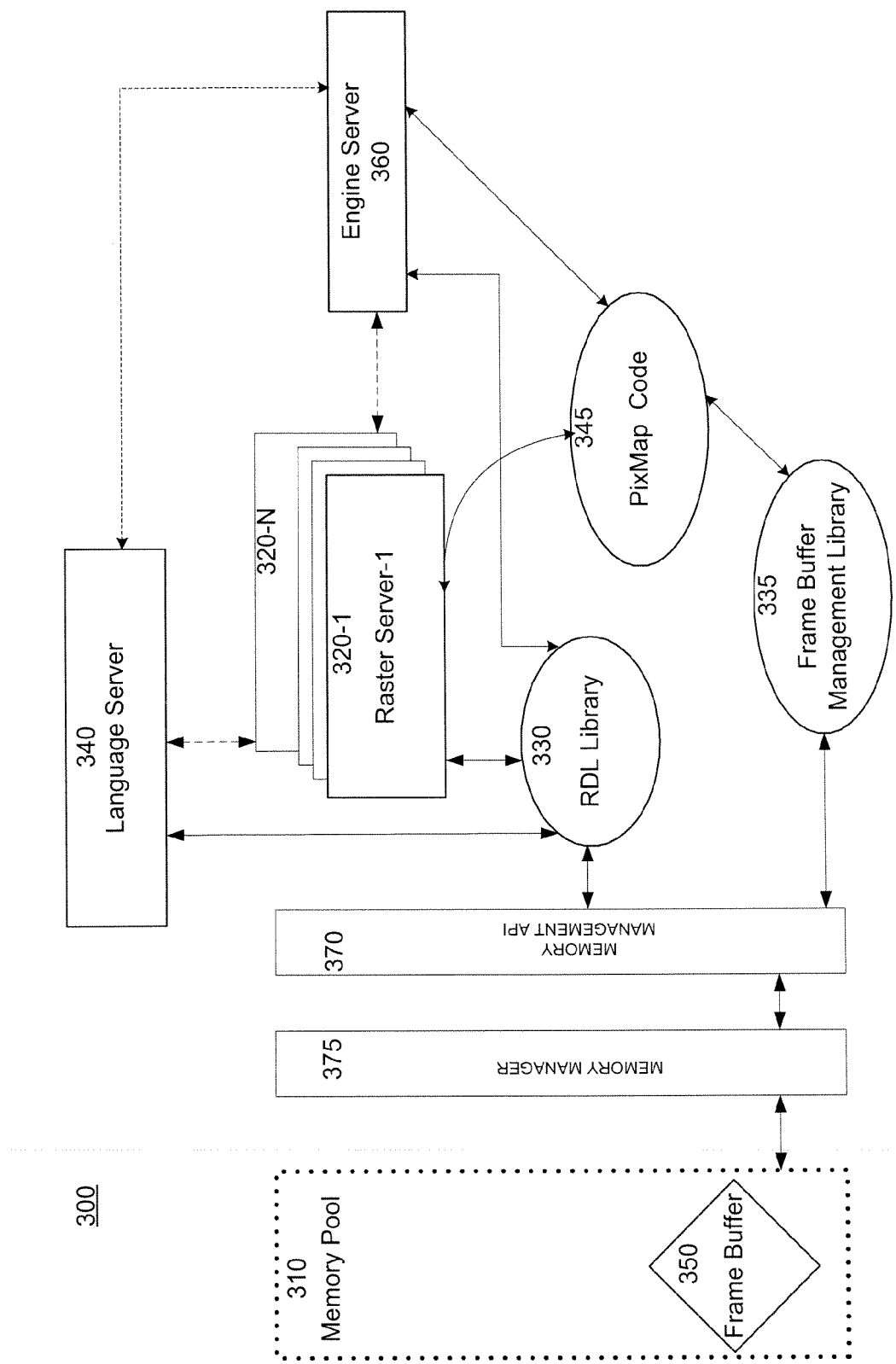
FIG. 3 shows an exemplary high-level architecture of a system for creating and processing display lists generated from PDLs.

FIG. 3 shows an exemplary high-level architecture 300 of a system for concurrent display list generation and parallel rasterization. As shown in FIG. 3, language server 340, engine server 360, and raster servers 320-1 to 320-N may communicate with each other. In addition, language server 340, engine server 360, and raster servers 320-1 to 320-N may invoke routines and communicate with RDL library 330. In some embodiments, raster servers 320-1 to 320-N may operate in parallel to perform rasterization. The system may also include frame buffer management library 335, which communicates with pixmap code 345; and with raster servers 320-1 to 320-N and engine server 360 through memory management API 370. The term pixmap (or pixel map) is used to denote a raster image that can exist at a number of bit depths. A bitmap, in which each pixel is assigned a single bit (i.e. the pixel is either "on" or "off"), is a pixmap of bit-depth 1.

Memory manager 375 can allocate and manage memory. Routines in memory manager 375 may be accessed using memory management API 370. Consistent with disclosed embodiments, architecture 300 permits memory pool 310 to be managed as a single memory pool comprising blocks corresponding to both frame buffer 350 and non-frame buffer blocks. On one hand, memory manager 375 may permit memory allocation in blocks to prevent fragmentation, to abstract away implementation details pertaining to memory management, and to provide a standard interface through memory management Application Programming Interface ("API") 370 for access to its routines.

On the other hand, pixmap code 345 allows pixmaps to be viewed logically as an integral unit while permitting pixmaps to occupy one or more discontiguous memory blocks in memory pool 310 by leveraging the functionality provided by memory manager 375 through memory management API 370 and frame buffer management library 335. This abstraction can be achieved using frame buffer management library 335 to manage: block and pointer allocation and deallocation for pixmaps; state information pertaining to pixmaps; and to track processes utilizing pixmaps. In some embodiments, pixmap code 345 may enable access to memory blocks for pixmaps. Each memory block is a chunk of contiguous memory. Memory blocks may contain one or more scanlines. A scanline is one row of pixels in the image.

In some embodiments, frame buffer management library 335 may allocate memory in blocks. In one embodiment, the blocks may be of equal size. In another embodiment, memory may be allocated either as a block, or as an integral multiple of blocks called a super-block. A super-block is a set of contiguous blocks. For example, frame buffer management library 335 may allocate memory in blocks and super-blocks, where a super-block may comprise four blocks. Super-blocks may be useful to hold larger pixmaps and also to facilitate support for different paper sizes, resolutions, and orientations.

In one embodiment, routines in memory manager 375 may manage some subset of available memory in memory 172 as memory pool 310 and allocate memory from memory pool 310 to requesting processes through memory management API 370. When memory is no longer needed by the requesting processes, the memory may be deallocated and returned to memory pool 310, where it can be made available to other processes. Thus, exemplary memory manager 375 may also provide various other memory management functions, including routines to free memory, routines to recover memory, and swapping routines that can swap memory to secondary storage 173.

In some embodiments, frame buffer 350 may also be a part of memory pool 310 and may be managed by memory manager 375. For example, calls to functions in frame buffer management library 335, may result in calls to functions in memory management API 370. Memory management API 370 may then invoke one or more functions in memory manager 375. Results of the actions taken by memory manager 375 may be routed back to the calling process.

Frame buffer management library 335 may use memory manager 375 to obtain blocks and pointers, using interfaces specified in the memory management API 370. In one embodiment, frame buffer 350 may be allocated an initial contiguous block of memory and subsequent memory blocks may be allocated to frame buffer 350 when requested. Memory blocks may also be allocated for other non frame-buffer purposes from memory pool 310. In some embodiments, distinct memory blocks assigned to the frame buffer 350 or to other processes may occupy non-contiguous memory locations in memory 172.

In some embodiments, the display list may include commands defining data objects and their contexts within a document or a page within the document to be printed. These display commands may include data comprising characters or text, graphic objects such as lines, and images or raster data. In some embodiments, the display list may be dynamically reconfigurable and is termed a Reconfigurable Display List ("RDL").

In some embodiments, an exemplary RDL may be stored in a data structure that facilitates the dynamic manipulation and processing of data objects. For example, objects in the RDL may include pointers to other objects in the RDL. Accordingly, an application may be able to traverse the list from one object to the next to identify, update, manipulate, and process objects. In addition, the application may be able to track processed objects and identify the "current" object being processed.

In some embodiments, a physical (printable) page may comprise one or more virtual or logical pages, also termed an RDL page. In some embodiments, an RDL page may further comprise one or more bands, also called geometric bands. A band can refer to a geometrically defined region within the geometrical bounds of an RDL page. In some embodiments, each band may be a horizontal section that holds objects present within that section of the logical page. In some embodiments, an RDL page may comprise a linked list of instances of exemplary individual band data structures. In some embodiments, the printable region of an RDL page can include all geometric bands contained within that RDL page.

In some embodiments, bands may further comprise a set of RDL data blocks, which hold objects within the band. In some embodiments, the RDL data blocks may be of equal size. In some embodiments, RDL data blocks may be used to store intermediate graphical objects and other data generated from a PDL description. In some embodiments, data sent to Language Server 340 for processing may include PDL data, and language server 340 may generate intermediate graphical objects and other data objects from the PDL description for use by raster servers 320-1 to 320-N. In some embodiments, objects generated by language server 340 may be used to build an RDL page.

In some embodiments, when data or graphical objects generated by language server 340 span band boundaries the objects may be stored in a separate referenced band and an offset to the location of the object in the referenced band is stored at an appropriate location in that specific geometric band. In some embodiments, objects that are repeatedly used in an RDL page, or a document, may also be stored in a referenced band. The referenced bands can include objects, which are referred to by other bands. So, for example, a single object in a single referenced band may be referred to multiple times by other bands.

In some embodiments, referenced data or graphical objects generated by language server 340 can comprise part of a larger complex object. In some embodiments, the complex object is rasterized before being used by geometric bands. Such complex objects may be stored in a separate resource band. For example, items in the resource band may include complex tiles or patterns, which can comprise simpler graphical, image, or text primitives. These complex objects are rasterized prior to their use by geometric bands.

In one embodiment, an RDL may be implemented using a data structure that allows certain display list objects to be stored in a manner that allows their manipulation dynamically. For example, image objects may be compressed in place to increase the amount of available memory, and decompressed when referenced and/or used. In some embodiments, an RDL may also permit RDL objects to be stored in memory and/or secondary storage by holding pointers, offsets, or addresses to the actual locations of RDL objects, which can then be retrieved when referenced and/or used. In general, the RDL allows display list objects to be flexibly stored and manipulated based on system constraints and parameters.

In one embodiment, the translation of a PDL description of a document into a display list and/or RDL representation may be performed by language server 340 using routines in RDL library 330 and memory manager 375. For example, language server 340 may take PDL language primitives and transform these into data and graphical objects and add these to the reconfigurable display list using the capability provided by functions in RDL library 330 and memory manager 375. In one embodiment, the display list may be stored and manipulated in a dynamically allocated memory pool such as exemplary memory pool 310, which may be part of memory 172.

In some embodiments, creation of the RDL may be an intermediate step in the processing of data prior to actual printing. The RDL may be parsed before conversion into a subsequent form. In some embodiments the subsequent form may be a final representation, and the conversion process may be referred to as rasterizing the data. For example, rasterization may be performed in parallel by raster servers 320-1 to 320-N using routines in frame buffer management library 335 and pixmap code 345. Upon rasterization, the rasterized data may be stored in frame buffer 350, which may be part of memory pool 310, using routines in memory manager 375, which may be accessed through memory management API 370. In one embodiment, the rasterized data may take the form of a bitmap or pixmap that specifies the marks to be made on a printed page.

Bands of an RDL page may be rasterized in parallel by one or more raster servers 320-1 to 320-N. In some embodiments, bands in an RDL page may be rasterized in parallel until all bands have been processed. In some embodiments, a band may be rasterized in a serial block-by-block manner until all objects have been provided to the rasterizer for that band. In some embodiments, the parallel processes performing the rasterization may be slave processes operating under the control of at least one master process, which can provide control and synchronization information. For example, raster server 320-1 may operate on a block in a band, while raster server 320-2 may operate on a different block in a different band. In some embodiments, raster servers 320-1 through 320-N may be distributed among the various cores of CPU 176 or DSP 179.

In a further embodiment, multiple finished RDL pages may exist in the system at any given time. These may include RDL pages whose rasterization process has not completed. In some embodiments, RDL pages need not be rasterized in the order of their construction. After rasterization is complete, engine server 360 may invoke routines in RDL library 330 to delete the RDL page from memory, and release memory used by that RDL page to memory pool 310.

In one embodiment, multiple rasterization processes can rasterize different parts of the display list for a single RDL page simultaneously. For example, in a master-slave environment, each parallel slave process can be assigned a band to rasterize. In some embodiments, the bands assigned to each slave process may be distinct.

In some embodiments, rasterization may occur when a block is filled or completed by language server 340. Language server 340 may then generate additional blocks in parallel to the rasterization of the first block. When a second block for a different band has been completed, rasterization may commence for the second block in parallel to any other block rasterization or generation process currently in progress. Additional concurrently completed blocks for different bands may also be rasterized in parallel with any other blocks that are currently being rasterized. In some embodiments, rasterization processes operating in parallel may run on different cores of multi-core CPU 176 or multi-core DSP 179.

In some embodiments, the parallel rasterization processes may be part of raster servers 320-1 to 320-N. In one embodiment, the parallel rasterization routines operate on distinct individual blocks corresponding to different bands. In some embodiments, the order in which bands may be rasterized may not be sequential. In one embodiment, parallel rasterization routines may be slave processes under the control of a master rasterization process. For example, a master process may control the creation and deletion of RDLs. In some embodiments, rasterization routines may operate in parallel on blocks in distinct bands, while blocks within a band are processed in sequence in a serial manner. In one embodiment, raster servers 320-1 to 320-N may also use routines in RDL library 330 and pixmap code 345 to perform their functions. For example, routines in pixmap code 345 may provide raster servers 320-1 to 320-N with access to pixmap routines to support parallel rasterization.

Exemplary engine server 360 may process data in the pixmap for printing of the document. In some embodiments, engine server 360 may provide control information, instructions, and data to print engine 177. In some embodiments, engine server 360 may invoke routines that lead to freeing memory used by frame buffer objects after processing. In some embodiments, portions of memory pool 310 and/or frame buffer 350 may reside in memory 172 or secondary storage 173. In some embodiments, routines for language server 340, raster servers 320-1 to 320-N, and engine server 360 may be provided in firmware 171 or may be implemented using ASICs/FPGAs 178.

Print engine 177, may process the rasterized data in frame buffer 350, and form a printable image of the page on a print medium, such as paper using routines in frame buffer library 335. In one embodiment, engine server 360 may also use routines in RDL library 330 and pixmap code 345. For example, routines in pixmap code 345 may permit a final pixmap comprising one or more color plane components, and an alpha plane component to be utilized by print engine 177 through engine server 360.

Figure 4:
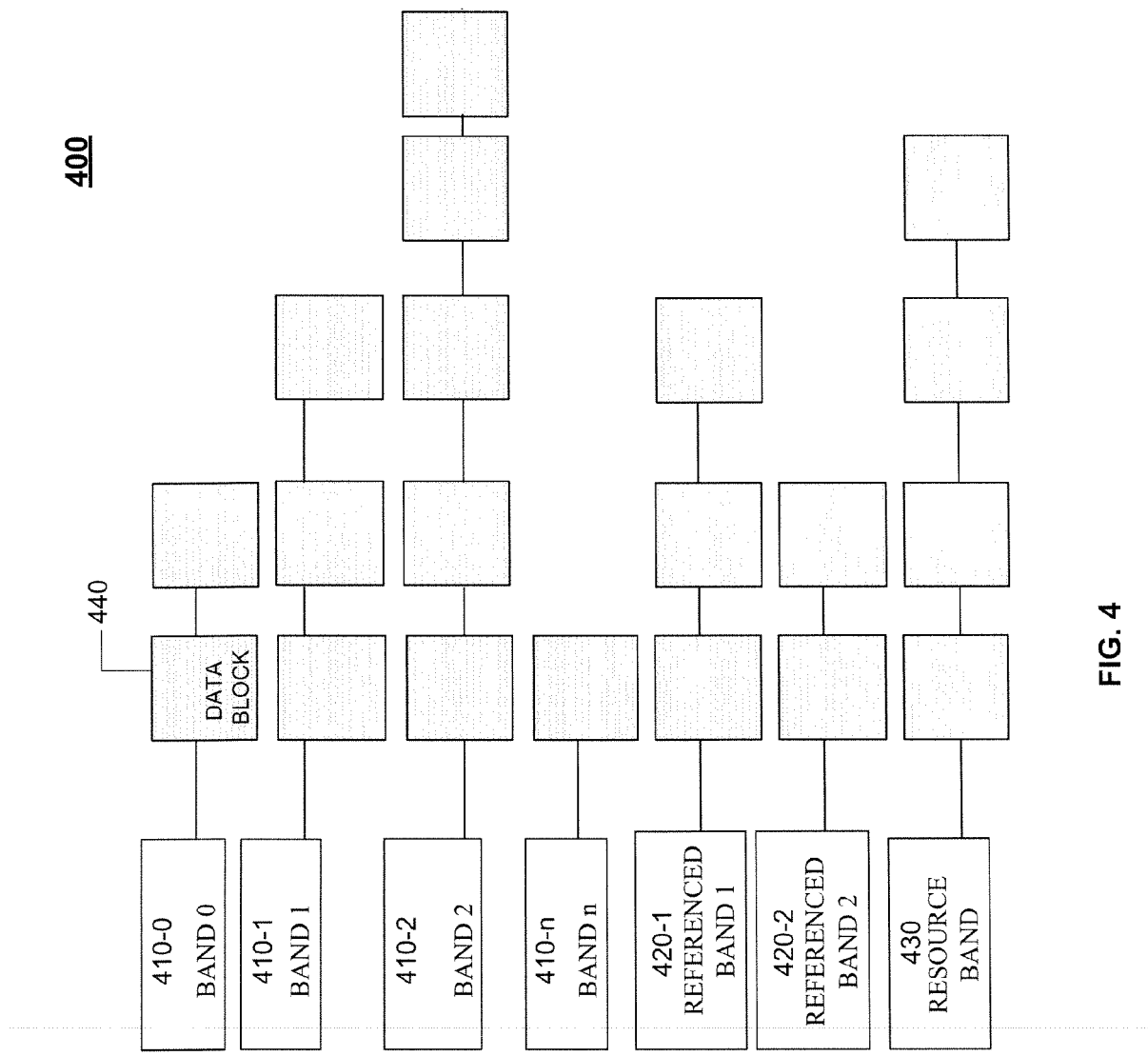
FIG. 4 shows an exemplary structure of a completed Reconfigurable Display List ("RDL") page 400.

FIG. 4 shows an exemplary structure of a completed RDL page 400. As shown in FIG. 4, exemplary RDL page 400 comprises a series of drawable bands 410-0 through 410-n. In some embodiments, a drawable band may comprise RDL data blocks 440. RDL data blocks 440 may comprise a series of equal-sized memory blocks, which may correspond to blocks managed by memory manager 375 from memory pool 310. Exemplary RDL page 400 may also comprise one or more Referenced Bands 420. As shown in FIG. 4, exemplary RDL page 400 also comprises Referenced Bands 420-1 and 420-2 and Resource Band 430.

As noted earlier, referenced band 420 can store objects that span band boundaries and objects that are used repeatedly across bands, while resource band 430 can hold complex objects used across different drawable bands that need special processing before they can be used in conventional drawable bands 410. In traditional methods, rasterization can commence when pages 400 are completed. Therefore, in traditional methods, some of the cores in CPU 176 may idle until the page has been completely processed by language server 340.

Figure 5:
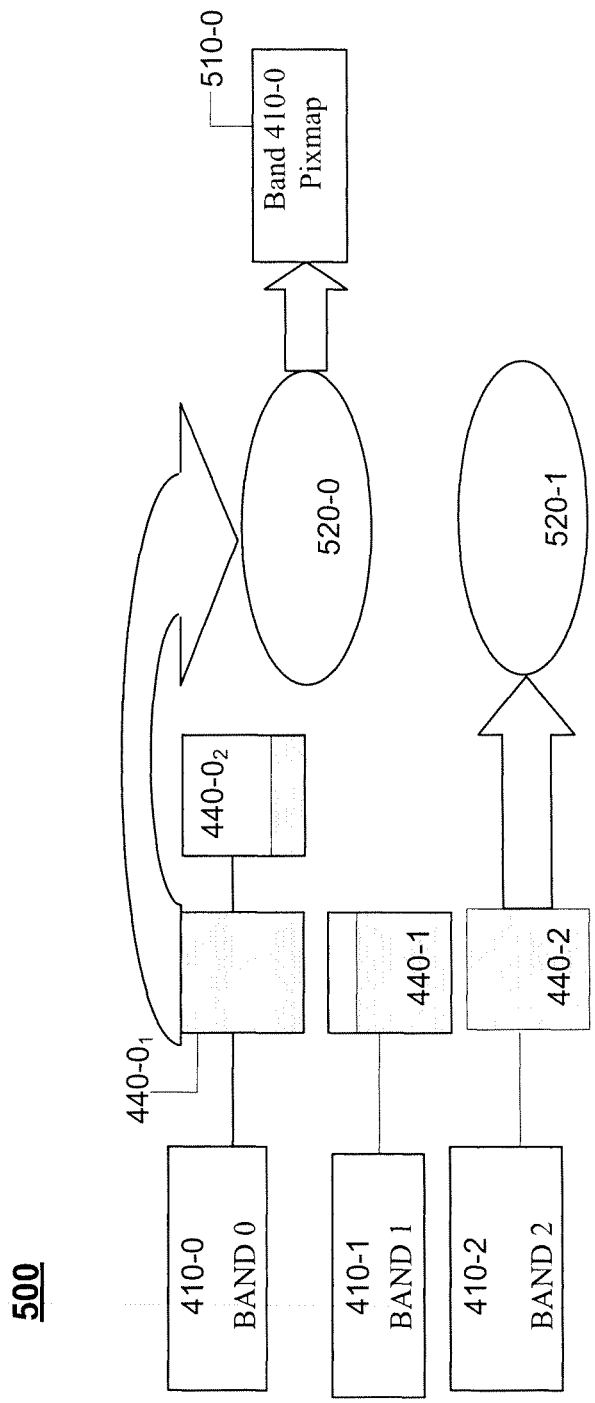
FIG. 5 shows a block diagram 500 illustrating concurrent generation and parallel rasterization of an exemplary incomplete RDL page.

FIG. 5 shows a block diagram 500 illustrating concurrent generation and parallel rasterization of an exemplary incomplete RDL consistent with embodiments disclosed herein. As shown in FIG. 5, the RDL comprises bands 410-0 through 410-2, and multiple RDL blocks 440 in various stages of completion. The RDL shown in FIG. 5 is being constructed by language server 340. Band 410-0 comprises RDL blocks $440-0_1$ and $440-0_2$. RDL block $440-0_1$ has been completed as shown by the shaded pattern completely filling the block. RDL block $440-0_2$ is still being constructed by language server 340 as shown by the shaded pattern partially filling the block. Similarly, the construction of RDL block 440-1 is in progress, while the construction of RDL block 440-2 has been completed by language server 340.

In some embodiments, rasterization can begin as soon as the first RDL block 440 in drawable band 410 becomes full. In some embodiments, a rasterization routine running on a core of CPU 176 or DSP 179 may begin processing completed RDL block 440. In some embodiments, completed RDL block 440 can be processed or consumed by an available slave rasterization process 520. During this time, language server 340 may continue to populate display lists in the RDL page. When an RDL block 440 in a different band 410 becomes full, then RDL block 440 can be processed by another available slave rasterization process 520.

When a slave rasterization process 520 completes the rasterization of RDL block 440, RDL block 440 can be freed and returned to memory pool 310. The process may be repeated for all completed blocks using available slaves. In some embodiments, slave rasterization process 520 may be marked as available when it completes the rasterization of RDL block 440. In some embodiments, slave rasterization process 520 may be marked as unavailable when it starts processing RDL block 440. In some embodiments, each slave rasterization process 520 may run on a distinct core of CPU 176 and/or DSP 179. In some embodiments, the process may run on a multi-core CPU in computing device 110.

As shown in FIG. 5, slave rasterization process 520-0 has started rasterizing RDL block 440-1 and begun the generation of pixmap 510-0 corresponding to band 410-0. Concurrently, slave rasterization process 520-1 is starting the rasterization of a newly completed RDL block 440-2, while language server continues to build RDL blocks 440-1 and $440-0_2$. In one embodiment, slave rasterization processes 520 may be implemented as part of raster servers 320-1 to 320-N. In one embodiment, RDL may also be used to keep track of blocks 440 that have been rendered. In some embodiments, a master rasterization process, or a page management task ("PMT") can keep track of available slaves.

Any RDL referenced bands 420, which can hold referenced objects and attribute objects, can continue to accumulate RDL blocks 440. Data in RDL blocks 440 in referenced bands 420 may be referenced and used throughout the life of the page. Therefore, in some embodiments, data in RDL blocks 440 in referenced bands may be rasterized more than once during the rasterization of an RDL page. Because drawable bands 410 are continuously rasterized, a greater portion of memory pool 310 may be available, making it less likely that RDL blocks will be swapped to secondary storage 173 or compressed in place. If memory is unavailable, then language server 340 may wait for consumed blocks to be freed, or may delete reference bands 420, or invoke memory manager 375 to apply one or more memory recovery strategies. Any deleted referenced bands 420 can be regenerated at a later point.

In some embodiments, resource band 430 may be rasterized as soon as the display list for a single complex object is generated. In some embodiments, the processing of bands that reference resource band 430 may be stalled until the referenced complex object in resource band 430 have been completely processed.

In some embodiments, the disclosed parallel rasterization schemes can make use of available processor cores by scheduling additional slave rasterization processes 510 on the cores. Accordingly, rasterization processes are effectively pipelined so that a page is being rendered in stages (corresponding to completed RDL blocks 440) as the page is being built. Accordingly, when an RDL page has been produced by language server 340, a substantial portion of the page may already have been rasterized by slave rasterization processes 520. Therefore, rasterization for the entire page can be completed shortly thereafter.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A method for the concurrent generation and parallel rasterization of at least one display list in a memory pool comprising frame buffer memory and display list memory, wherein the display list comprises a plurality of bands comprised of one or more equal-sized display list blocks, the method comprising:
   for each band in the plurality of bands in the display list, determining completion status of a display list block in the band;
   if the display list block is completed, assigning the completed display list block to an available rasterization process while concurrently generating next display list block in the band; and
   rasterizing the display list block using the available rasterization process, wherein the rasterization process comprises, marking the display list block as rendered, returning the display list block to the memory pool, and indicating the availability of the rasterization process,
   wherein the method is performed on a device comprising a plurality of processing cores, wherein the rasterization process runs on a processing core of the plurality of processing cores distinct from any other concurrently executing rasterization process, wherein each concurrently executing rasterization process operates on a distinct display list block, and wherein each display list block corresponds to a distinct band.

2. The method of claim 1, further comprising storing the rendered display list blocks in a pixmap associated with the display list in the memory pool.

3. The method of claim 2, wherein the pixmap comprises discontiguous memory blocks.

4. The method of claim 1, wherein the device is a printer.

5. The method of claim 4, wherein the processing core is located within a Digital Signal Processor.

6. The method of claim 1, wherein the available rasterization process executes concurrently with any previously executing rasterization processes.

7. The method of claim 1, wherein the rasterization processes are slave processes operating under the control of a master rasterization process.

8. The method of claim 1, wherein assigning the completed display list block to an available rasterization process further comprises indicating the unavailability of the rasterization process.

9. A non-transitory computer-readable medium that contains instructions, which when executed by a processor perform steps in a method for the concurrent generation and parallel rasterization of at least one display list in a memory pool comprising frame buffer memory and display list memory, wherein the display list comprises a plurality of bands comprised of one or more equal-sized display list blocks, the method comprising:

for each band in the plurality of bands in the display list, determining completion status of a display list block in the band;

if the display list block is completed, assigning the completed display list block to an available rasterization process while concurrently generating next display list block in the band; and rasterizing the display list block using the available rasterization process, wherein the rasterization process comprises, marking the display list block as rendered, returning the display list block to the memory pool, and indicating the availability of the rasterization process, wherein the method is performed on a device comprising a plurality of processing cores, wherein the rasterization process runs on a processing core of the plurality of processing cores distinct from any other concurrently executing rasterization process, wherein each concurrently executing rasterization process operates on a distinct display list block, and wherein each display list block corresponds to a distinct band.

10. The computer readable medium of claim 9, further comprising storing the rendered display list blocks in a pixmap associated with the display list in the memory pool.

11. The computer readable medium of claim 10, wherein the pixmap comprises discontiguous memory blocks.

12. The computer readable medium of claim 9, wherein the available rasterization process executes concurrently with any previously executing rasterization processes.

13. The computer readable medium of claim 9, wherein assigning the completed display list block to an available rasterization process further comprises indicating the unavailability of the rasterization process.

14. A non-transitory computer-readable medium that contains instructions, which when executed by a processor perform steps in a method for the concurrent generation and parallel rasterization of at least one display list in a memory pool comprising frame buffer memory and display list memory, wherein the display list comprises a plurality of bands comprised of one or more equal-sized display list blocks, the method comprising:

for each band in the plurality of bands in the display list, determining completion status of a display list block in the band;

if the display list block is completed, assigning the completed display list block to an available rasterization process while concurrently generating next display list block in the band, wherein assigning the completed display list block to an available rasterization process further comprises indicating the unavailability of the rasterization process; and rasterizing the display list block using the available rasterization process, wherein the rasterization process comprises, marking the display list block as rendered, returning the display list block to the memory pool, and indicating the availability of the rasterization process, wherein the method is performed on a device comprising a plurality of processing cores, and wherein the rasterization process runs on a processing core of the plurality of processing cores distinct from any other concurrently executing rasterization process.

* * * * *